United States Patent
Nakata

(10) Patent No.: US 8,346,194 B2
(45) Date of Patent: Jan. 1, 2013

(54) RADIO BROADCAST RECEIVER

(75) Inventor: Kazuhiro Nakata, Tokyo (JP)

(73) Assignee: Mitsubishi Electronic Corporation, Tokyo (JP)

(*) Notice: Subject to any disclaimer, the term of this patent is extended or adjusted under 35 U.S.C. 154(b) by 0 days.

(21) Appl. No.: 13/318,506

(22) PCT Filed: Aug. 21, 2009

(86) PCT No.: PCT/JP2009/004021
§ 371 (c)(1),
(2), (4) Date: Nov. 2, 2011

(87) PCT Pub. No.: WO2011/021252
PCT Pub. Date: Feb. 24, 2011

(65) Prior Publication Data
US 2012/0058740 A1 Mar. 8, 2012

(51) Int. Cl.
*H04B 1/06* (2006.01)
(52) U.S. Cl. ..................... 455/182.1; 455/257
(58) Field of Classification Search ............... 455/179.1, 455/180.1, 182.1, 182.2, 182.3, 185.1, 186.1, 455/190.1, 207, 255, 257, 259
See application file for complete search history.

(56) References Cited

U.S. PATENT DOCUMENTS

| | | | | |
|---|---|---|---|---|
| 8,185,071 B2 * | 5/2012 | Sano et al. | | 455/182.2 |
| 2006/0003718 A1 * | 1/2006 | Oohata et al. | | 455/186.1 |
| 2007/0087714 A1 * | 4/2007 | Chang | | 455/207 |

FOREIGN PATENT DOCUMENTS

| | | |
|---|---|---|
| JP | 01-132968 A | 5/1989 |
| JP | 2005-184534 A | 7/2005 |
| JP | 2006-253885 A | 9/2006 |
| WO | WO 2008/084539 A1 | 7/2008 |

* cited by examiner

*Primary Examiner* — Thanh Le
(74) *Attorney, Agent, or Firm* — Birch, Stewart, Kolasch & Birch, LLP

(57) ABSTRACT

A radio broadcast receiver includes a front end unit for tuning by changing a local oscillation frequency; and a control unit for managing by dividing the receiving band into a third frequency domain including a third frequency obtained by subtracting the intermediate frequency from an upper end frequency of the receiving band, a first frequency domain including a first frequency obtained by adding the intermediate frequency to a lower end frequency of the receiving band, and a second frequency domain where the first frequency domain and third frequency domain overlap, and for switching, when tuning is made across the frequency domains, the local oscillation frequency to an upper local oscillation frequency when the tuning frequency is higher than the third frequency by controlling the front end unit, and to a lower local oscillation frequency when it is lower than the first frequency by controlling the front end unit.

2 Claims, 7 Drawing Sheets

$f_{IF} = 10.7MHz$

RADIO BROADCAST RECEIVER

TECHNICAL FIELD

The present invention relates to a radio broadcast receiver having two tuners for independently receiving different frequencies in a receiving band with a receiving bandwidth broader than an intermediate frequency.

BACKGROUND ART

Conventionally, a radio broadcast receiver has been known which receives broadcasting stations with different frequencies in the same receiving band using main and sub two tuners, respectively.

As for a broadcasting signal a radio broadcast receiver receives, tuning is done by adjusting the oscillation frequency (local oscillation frequency $f_{L\ O\ C}$) of a local oscillator in a front end.

How much the local oscillator lowers the frequency f of the received signal depends on whether the frequency is higher or lower than the local oscillation frequency $f_{L\ O\ C}$. In either case, the intermediate frequency $f_{IF}$ becomes $f_{IF}=|f-f_{L\ O\ C}|$. Accordingly, the frequency that is likely to become the local oscillation frequency $f_{L\ O\ C}$ is two: $f_{L\ O\ C}=f+f_{IF}$ and $f_{L\ O\ C}=f-f_{IF}$. The former is referred to as an upper local oscillation frequency and the latter is referred to as a lower local oscillation frequency.

However, when the intermediate frequency $f_{IF}$ is smaller than the receiving bandwidth (upper end frequency−lower end frequency), the following problem occurs when trying to receive different broadcasting stations within the same receiving band by the two tuners. More specifically, regardless of whether the upper local oscillation frequency or the lower local oscillation frequency, when the local oscillation frequency of a first tuner agrees with the receiving frequency of the second tuner or if it crosses the receiving frequency of the second tuner when altering its tuning, noise is mixed in the second tuner owing to interference and receiving performance is lowered.

For example, as shown in FIG. 7, on the assumption that the receiving bandwidth is 76 MHz–90 MHz, the intermediate frequency $f_{IF}$ is 10.7 MHz and the receiving frequency of the first tuner is 89.4 MHz, although the upper local oscillation frequency (upper local oscillation) which is 89.4+10.7=100.1 MHz is beyond the band, the lower local oscillation frequency (lower local oscillation) which is 89.4−10.7=78.7 MHz falls within the band. Thus, when trying to receive a broadcasting station within the same receiving band by the second tuner, the interference due to the local oscillation frequency can occur.

In view of this, to prevent the local oscillation frequency of the first tuner from interfering with the receiving frequency of the second tuner, Patent Document 1 discloses a conventional technique that stops the second tuner from receiving at the frequency when the local oscillation signal of a particular receiving frequency of the first tuner and its harmonics agree with the receiving frequency of the second tuner.

Prior Art Document
Patent Document
Patent Document 1: Japanese Patent Laid-Open No. 1-132968 (1989).

According to the technique disclosed in the foregoing Patent Document 1, since the second tuner cannot continue receiving, a problem arises in that the double tuners consisting of the main and sub two tuners cannot achieve the original performance.

The present invention is implemented to solve the foregoing problem. Therefore it is an object of the present invention to provide a radio broadcast receiver capable of enabling the main and sub two tuners to continue their reception by preventing the local oscillation frequency from interfering with the second tuner beforehand.

DISCLOSURE OF THE INVENTION

A radio broadcast receiver in accordance with the present invention has two tuners for independently receiving different frequencies in a receiving band with a receiving bandwidth greater than an intermediate frequency and not greater than twice the intermediate frequency, and includes a control unit for managing by dividing the receiving band into a third frequency domain obtained by subtracting the intermediate frequency from the upper end frequency of the receiving band, a first frequency domain obtained by adding the intermediate frequency to the lower end frequency of the receiving band, and a second frequency domain in which the third frequency domain and the first frequency domain overlap.

According to the present invention, it can achieve continuous receiving of broadcasts by the two tuners by switching the local oscillation frequency in accordance with conditions because it can prevent the first local oscillation frequency from interfering with the second tuner even if the intermediate frequency is less than the receiving bandwidth, and because it can eliminate, with the high-frequency switch, interference inclusive of that in the transient state at the tuning change.

EMBODIMENTS FOR CARRYING OUT THE INVENTION

The best mode for carrying out the invention will now be described with reference to the accompanying drawings to explain the present invention in more detail.

Embodiment 1

Figure 1:
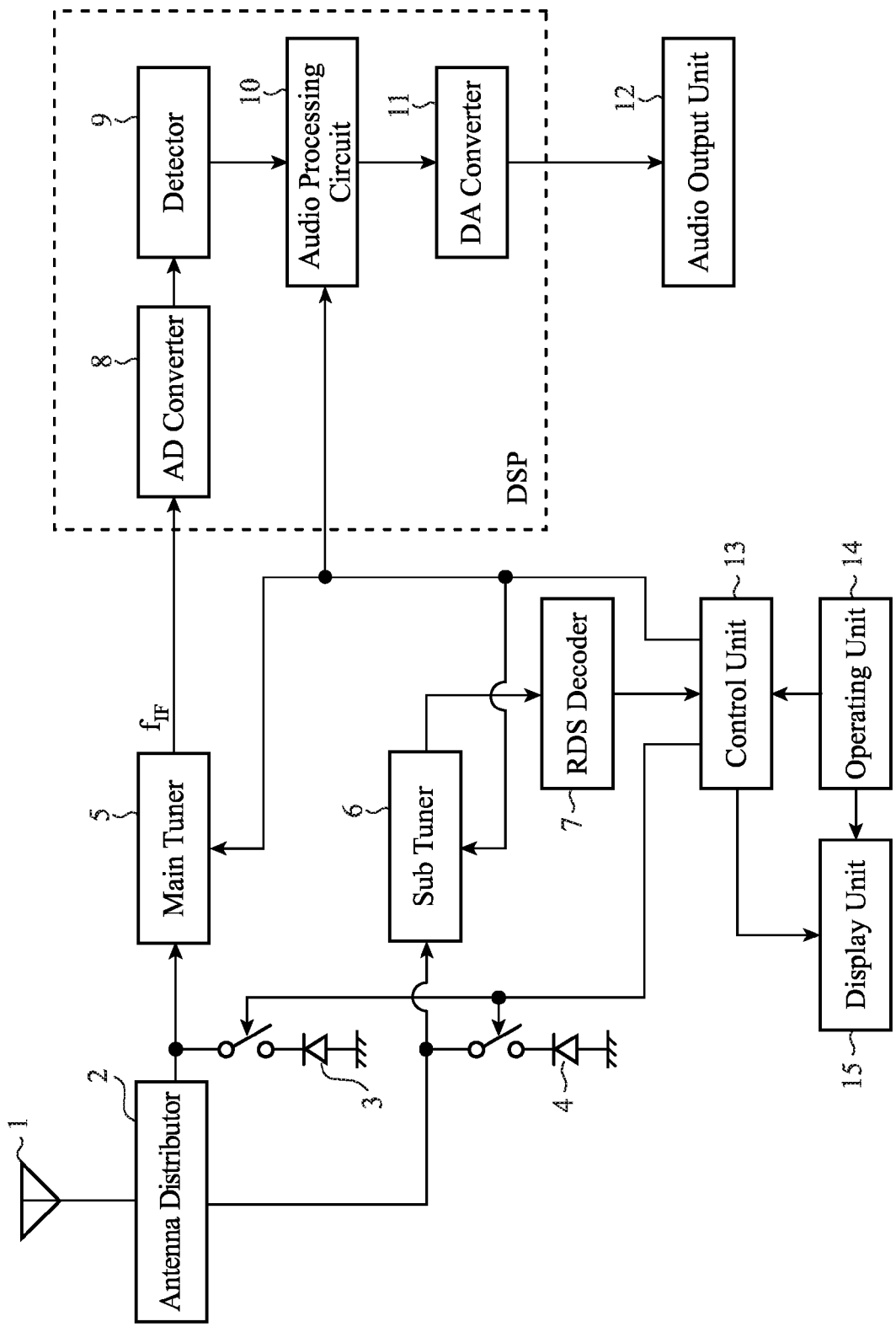
FIG. 1 is a block diagram showing a configuration of a radio broadcast receiver of an embodiment 1 in accordance with the present invention.

FIG. 1 is a block diagram showing a configuration of a radio broadcast receiver of an embodiment 1 in accordance with the present invention. Here, an RDS (Radio Data System) receiver, which can display the name of a broadcasting station in tuning and the title of a musical composition the broadcast is reproducing and which is widely spread in Europe in particular, is shown as an example of the radio broadcast receiver.

In FIG. 1, the radio broadcast receiver comprises a radio antenna 1, an antenna distributor 2, PIN (p-intrinsic-n) diodes 3 and 4, a main tuner 5, a sub tuner 6, an RDS decoder 7, an AD (Analog-Digital) converter 8, a detector 9, an audio processing circuit 10, a DA (Digital-Analog) converter 11, an audio output unit 12, a control unit 13, an operating unit 14 and a display unit 15.

In the foregoing configuration, broadcast radio waves received with the radio antenna 1 are supplied to the antenna distributor 2. The antenna distributor 2 splits the antenna input in two, and supplies to the main tuner 5 and sub tuner 6, respectively. Incidentally, the broadcast radio waves which are the output of the antenna distributor 2 are supplied to the PIN diodes 3 and 4 operating as a high-frequency switch, as well. The PIN diode 3 or 4 has its first end connected between the antenna distributor 2 and a front end unit the main tuner 5 (sub tuner 6) includes, and its second end grounded. It can absorb a leakage of the local oscillator of the main tuner 5 (sub tuner 6) by turning it on (short-circuiting it). The main tuner 5 can output the intermediate frequency and the sub tuner 6 can output detected sounds.

Figure 2:
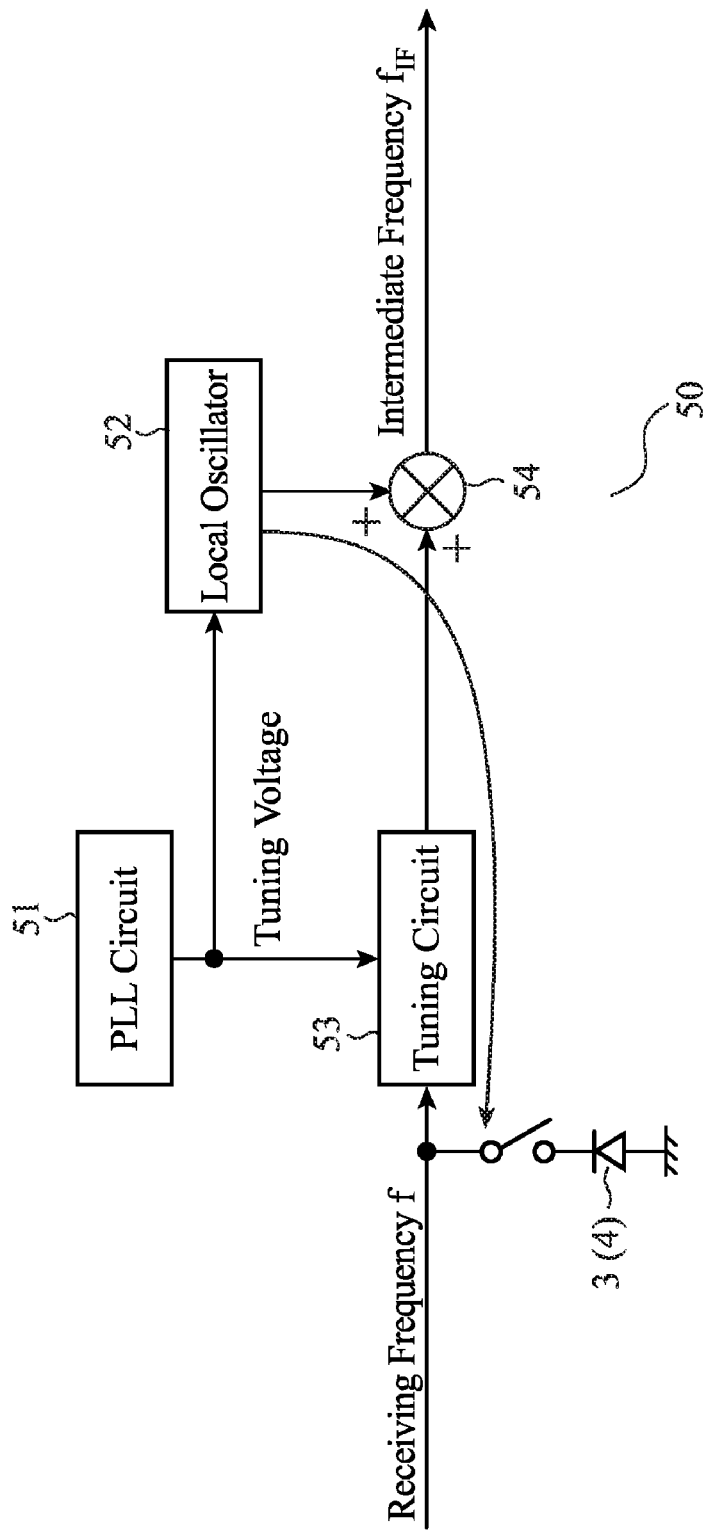
FIG. 2 is a block diagram showing a configuration of a front end unit of the radio broadcast receiver of the embodiment 1 in accordance with the present invention.

FIG. 2 shows a configuration of an RF (Radio Frequency) front end unit 50 the main tuner 5 and sub tuner 6 include.

The RF front end unit 50, which is a portion for tuning by altering the local oscillation frequency, includes a PLL (Phase Locked Loop) 51, a local oscillator 52, a tuning circuit 53 and a mixer 54. The radio wave received via the radio antenna 1 and antenna distributor 2 is input to the tuning circuit 53 as the received signal, and is mixed by the mixer 54 with the waveform (local oscillation frequency) generated via the PLL circuit 51 and by the local oscillator 52 to generate the intermediate frequency signal ($f_{IF}$). As is well known, the PLL circuit 51 is a frequency control circuit for altering, for correcting the shift between the reference frequency of the tuner and the receiving frequency, the local oscillation frequency by the amount of the shift.

Incidentally, the tuning circuit 53 has its input terminal connected to the PIN diode 3 (4) so that the PIN diode 3 (4) absorbs the leakage of the local oscillation signal (denoted by an arrow in FIG. 2) which is generated via the local oscillator 52, mixer 54 and tuning circuit 53 and interferes with the receiving frequency of the second tuner 6 (5).

Let us return to the description of FIG. 1. The RDS decoder 7 decodes data other than the sound signal in the received signal, and transfers the data to the control unit 13 in which a microprocessor is mounted, for example.

Figure 5:
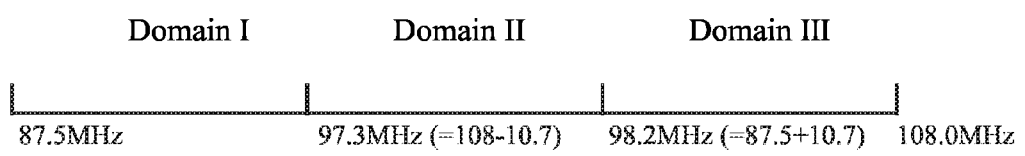
FIG. 5 is a diagram showing relationships between the receiving band and local oscillation frequencies of the radio broadcast receiver of the embodiment 1 in accordance with the present invention.

As shown in FIG. 5, for example, the control unit 13 splits the receiving band into a third frequency domain (III) including a third frequency obtained by subtracting the intermediate frequency from the upper end frequency of the receiving band, a first frequency domain (I) including a first frequency obtained by adding the intermediate frequency to the lower end frequency of the receiving band, and a second frequency domain (II) in which the first frequency domain and third frequency domain overlap, and manages them; and when the RF front end unit 50 changes tuning across a frequency domain, it controls the RF front end unit 50 in such a manner as to switch to the upper local oscillation frequency if the tuning frequency is greater than the third frequency, and to the lower local oscillation frequency if the tuning frequency is lower than the first frequency. In addition, the control unit 13 controls the high-frequency switch (PIN diode 3 or 4), which has its first end connected between the antenna terminal of the main tuner 5 or sub tuner 6 and the RF front end unit 50 thereof and has second first end grounded, in connection with the switching to the upper local oscillation frequency or to the lower local oscillation frequency. The detail will be described later with reference to FIG. 3.

Incidentally, the AD converter 8 samples the $f_{IF}$ signal from the main tuner 5 (RF front end unit 50) and converts to a digital signal. The detector 9 detects the sound signal or signal intensity, and the audio processing circuit 10 adjusts volume and tone control. The DA converter 11 converts the digital signal fed from the audio processing circuit 10 to an analog signal and supplies it to the audio output unit 12 including an amplifier and a speaker driving system. These components are all included in a DSP (Digital Signal Processor).

The operating unit 14 consists of key switches for transferring a user instruction such as tuning to the control unit 13, and the display unit 15 is a display monitor comprising an LCD (Liquid-Crystal Display), for example, for displaying the RDS information about the sub tuner 6.

Figure 3:
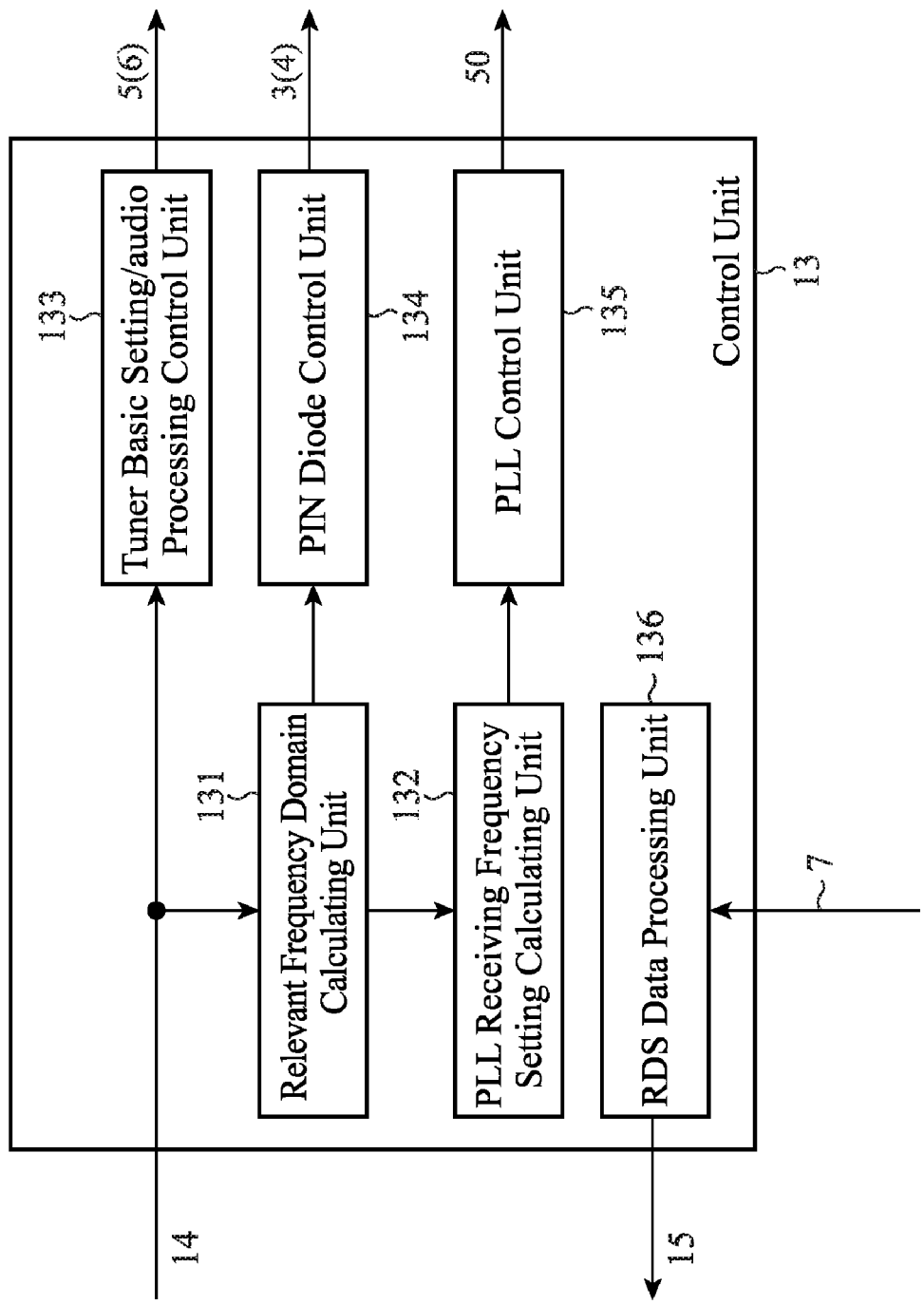
FIG. 3 is a block diagram showing a configuration of a control unit of the radio broadcast receiver of the embodiment 1 in accordance with the present invention.

FIG. 3 is a block diagram showing a configuration of the control unit 13 of the radio broadcast receiver of the embodiment 1 in accordance with the present invention.

In FIG. 3, the control unit 13 includes a relevant frequency domain calculating unit 131, a PLL receiving frequency setting calculating unit 132, a tuner basic setting/audio processing control unit 133, a PIN diode control unit 134, a PLL control unit 135 and an RDS data processing unit 136. These blocks are functional blocks that are realized under program control by the microprocessor in the control unit 13, the details of which will be explained with reference to the flowchart described later.

To decide as to whether tuning frequency change operation of the main tuner 5 or sub tuner 6 in response to manipulation of the operating unit 14 is a change that crosses the frequency domain or not, the relevant frequency domain calculating unit 131 calculates the relevant frequency domain every time the tuning frequency change operation is made, and controls the PLL receiving frequency setting calculating unit 132 and PIN diode control unit 134.

The PLL receiving frequency setting calculating unit 132 sets the local oscillation frequency to the PLL under the control of the relevant frequency domain calculating unit 131, and causes the PLL control unit 135 to carry out control of switching the local oscillation frequency to the upper local oscillation frequency when the tuning frequency is higher than the first frequency domain and to the lower local oscillation frequency when it is lower than the third frequency domain. In conjunction with the switching operation, the PIN diode control unit 134 performs the activating/deactivating control of the PIN diodes 3 and 4 under the control of the relevant frequency domain calculating unit 131.

In response to the content of operation of the operating unit 14, the tuner basic setting/audio processing control unit 133 carries out tuning operation by controlling the main tuner 5 and sub tuner 6, and adjusts tone or volume by controlling the audio processing circuit 10.

The RDS data processing unit 136 carries out data converting processing to display text information or the like decoded by the RDS decoder 7 on the display unit 15.

Figure 4:
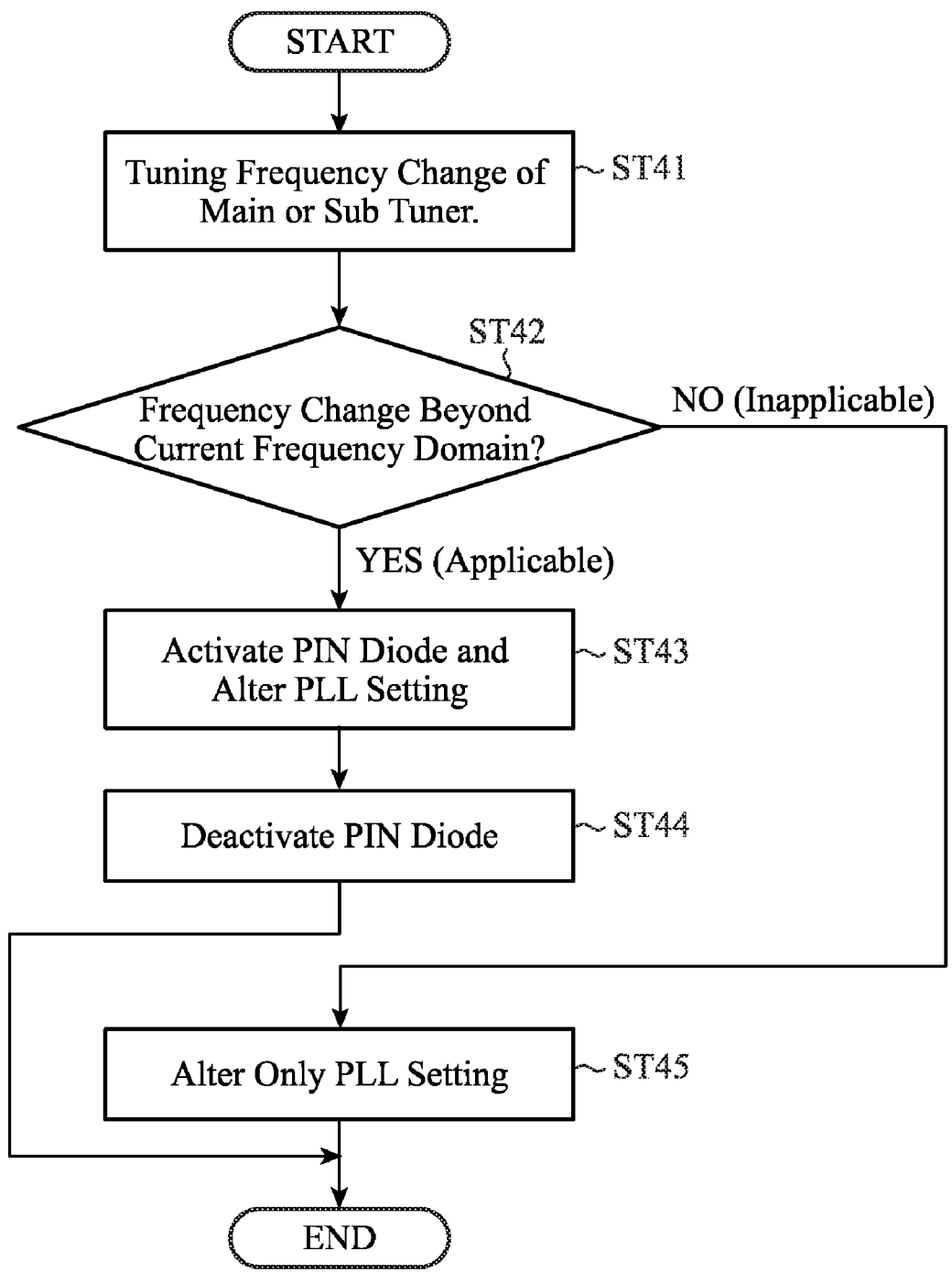
FIG. 4 is a flowchart showing the operation of the radio broadcast receiver of the embodiment 1 in accordance with the present invention.

FIG. 4 is a flowchart showing the operation of the radio broadcast receiver of the embodiment 1 in accordance with the present invention. Although the operation will be described with reference to FIG. 4, relationships between the receiving band and the local oscillation frequency and the state transition will be described with reference to FIG. 5 and FIG. 6 before that.

FIG. 5 shows an European FM band with the receiving frequency band of 87.5 MHz-108.0 MHz and the intermediate frequency ($I_{F\_M}$) of 10.7 MHz. Then, assume that the receiving frequency band is divided into three domains to be managed according to the relationships between the local oscillation frequency and the intermediate frequency. For example, the three domains are: the third frequency domain (domain III) given by subtracting the intermediate frequency 10.7 MHz from the upper end frequency of the receiving band; the first frequency domain (domain I) given by adding the intermediate frequency to the lower end frequency of the receiving band; and the second frequency domain (domain II) in which the first frequency domain and the third frequency domain overlap.

Figure 6:
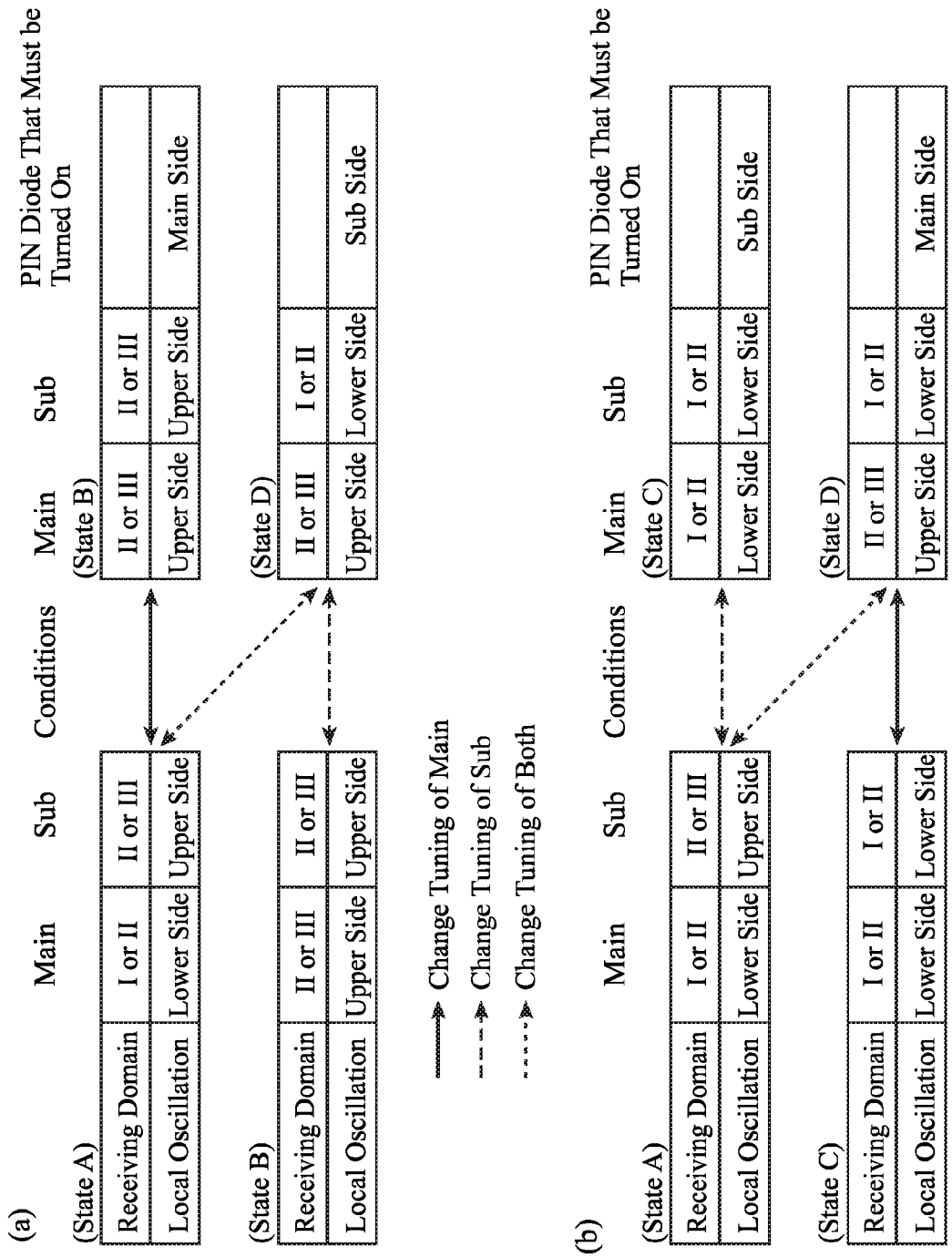
FIG. 6 is a diagram showing state transitions at the time of changing tuning of the radio broadcast receiver of the embodiment 1 in accordance with the present invention.
Figure 7:
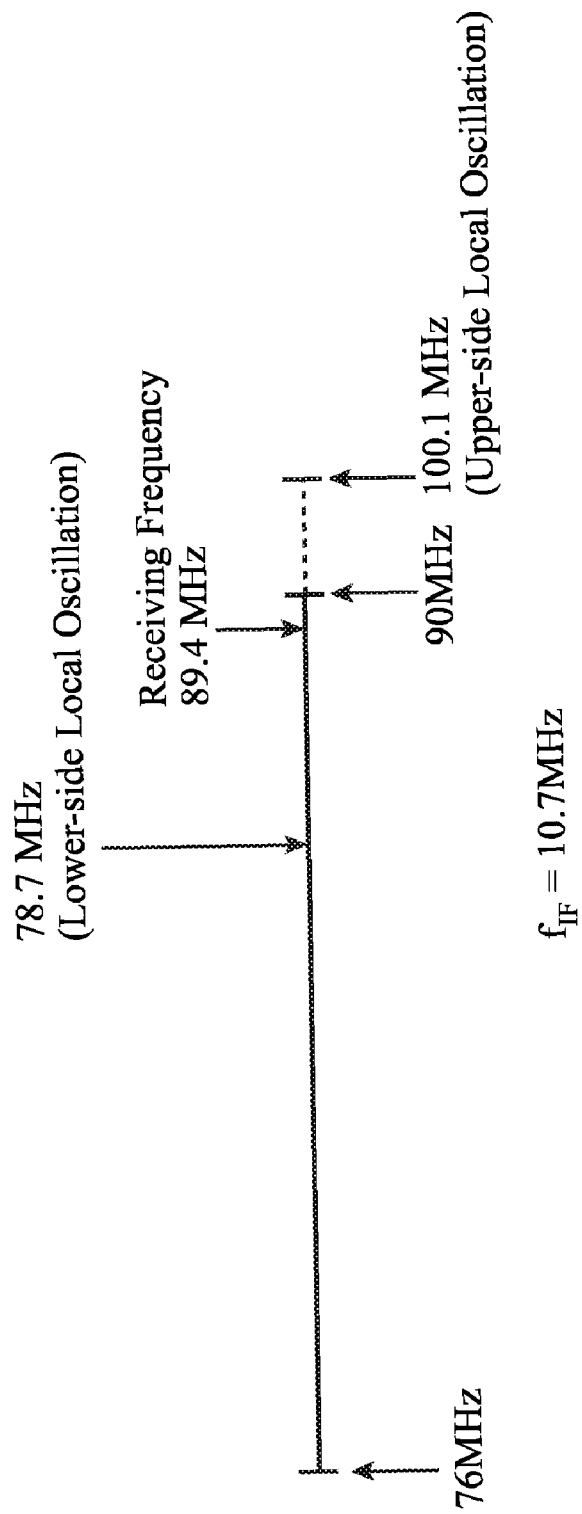
FIG. 7 is a diagram showing an example of relationships between the receiving band and local oscillation frequencies of the radio broadcast receiver.

Furthermore, as shown in FIG. 6, let us consider three states (A)-(C) and transitions between them. Among them, although the domain II is included in all the states (A)-(C), as for changes of the receiving frequency of the main tuner 5 or sub tuner 6 from the domain I or II to the domain II or from the domain II or III to the domain II, it is assumed that changes from the set local oscillation frequency are not made in each state. For example, when the main tuner 5 is tuned to 97.5 MHz and the sub tuner 6 is tuned to 102.0 MHz in the state A and the receiving frequency of the main tuner 5 is changed to 98.0 MHz, the state remains in the state A, and the setting of the local oscillation frequency is not necessary.

The operation of the radio broadcast receiver of the embodiment 1 in accordance with the present invention shown in FIG. 1-FIG. 3 will be described in detail below with reference to the flowchart of FIG. 4.

First, after a change of the tuning frequency of the main tuner 5 or sub tuner 6 made in response to manipulation of the operating unit 14 (step ST41), the control unit 13 decides with the relevant frequency domain calculating unit 131 as to whether the change is to a frequency out of the frequency domain the main tuner 5 (sub tuner 6) now stays in the state transition diagram of FIG. 6 (step ST42).

If a decision is made that it goes out of the current domain ("YES (applicable)" at step ST42), the control unit 13 activates the PIN diode 3 or 4 with the PIN diode control unit 13, and sets the local oscillation frequency calculated by the PLL receiving frequency setting calculating unit 132 to the PLL circuit 51 in the RF front end unit 50 via the PLL control unit 135 (step ST43).

After completing the PLL setting, the PIN diode control unit 134 deactivates the PIN diode 3 or 4 (step ST44).

On the other hand, if a decision is made at step ST42 that the setting keeps the relevant frequency domain ("NO (inapplicable)" at step ST42), the control unit 13 carries out only the operation of setting the local oscillation frequency to the PLL circuit 51 in the RF front end unit 50 via the PLL control unit 135 (step 45).

A supplementary explanation of the foregoing description of the operation will be made below with reference to the state transition diagram of FIG. 6. Here, two state transition examples (a) and (b) are shown.

In a state A in FIG. 6(a), it is assumed that the main tuner 5 stays in the domain I or II and the sub tuner 6 stays in the domain II or III, and that the lower local oscillation frequency (local oscillation) is set in the main tuner 5 and the upper local oscillation frequency is set in the sub tuner 6 by default. If a tuning change transfers the state of the main tuner 5 to the domain II or III, it makes a transition to a state B.

In this state, since the local oscillation frequency of the main tuner 5 can cross the receiving frequency of the sub tuner 6, the control unit 13 carries out the control of turning on (short-circuiting) the PIN diode 3 on the main tuner 5 side, and switching the main tuner 5 to the upper local oscillation frequency.

As for the transition between the state B and state D, since the local oscillation frequency of the sub tuner 6 can cross the receiving frequency of the main tuner 5, the control unit 13 carries out the control of turning on the PIN diode 4 on the sub tuner 6 side, and switching the sub tuner 6 to the lower local oscillation frequency.

Incidentally, the state D is substantially equivalent to the state A except that the main tuner 5 and sub tuner 6 are interchanged. In the transition between the states A and D, since the tuning frequencies of both the tuner 5 and tuner 6 change at the same time, the interference of the local oscillation frequency need not be considered. Accordingly, the control unit 13 need not control the PIN diode 3 or 4, but carries out only sound mute processing with the audio processing circuit 10 during a transient of the transition.

FIG. 6(b) is the same as FIG. 6(a) except that in the state C, the main tuner 5 stays in the domain I or II and the sub tuner 6 stays in the domain I or II, and the main tuner 5 is set at a lower local oscillation frequency (local oscillation) and the sub tuner 6 is set at a lower local oscillation frequency.

As for a transition between the state A and state C, since the local oscillation frequency of the sub tuner 6 can cross the receiving frequency of the main tuner 5, the control unit 13 carries out control of turning on the PIN diode 4 on the sub tuner 6 side, and of switching the local oscillation frequency to the lower local oscillation frequency. In addition, as for the transition from the state C to state D, since the local oscillation frequency of the main tuner 5 can cross the receiving frequency of the sub tuner 6, the control unit 13 carries out operation of turning on (short-circuiting) the PIN diode 3 on the main tuner 5 side, and of switching the local oscillation frequency of the main tuner 5 to the upper local oscillation frequency.

Incidentally, as for a transition between the states A and D, since the tuning frequencies of both the tuners change at the same time as in FIG. 6(a), the interference of the local oscillation frequency need not be considered. Accordingly, the control unit 13 need not control the PIN diode 3 or 4, but carries out only sound mute processing with the audio processing circuit 10 during a transient of the transition.

As described above, according to the radio broadcast receiver of the embodiment 1 in accordance with the present invention, it can remove the interference of the local oscillation frequency to the other tuner in both the receiving state and transient state at the tuning change by switching the local oscillation frequency in accordance with the conditions, thereby being able to continue reception of the two tuners.

More specifically, even if the intermediate frequency $f_{IF}$ is less than the receiving bandwidth (upper end frequency−lower end frequency), it can achieve an advantage of being able to prevent the sounds or RDS data from being interrupted because the first local oscillation frequency does not interference with the second tuner, inclusive of the transient state at tuning. In addition, as for intermediate frequency filters, although high quality ones are limited to those with a particular frequency, the radio broadcast receiver in accordance with the present invention can employ a high quality intermediate frequency filter by removing the interference to the other tuner.

Furthermore, according to the radio broadcast receiver of the embodiment 1 in accordance with the present invention, it can curb the number of times of turning on the PIN diode 3 or 4 to a minimum, thereby being able to reduce the load of the control unit.

Incidentally, as for the functions of the control unit 13 shown in FIG. 3, all of them can be realized by software, or at least part of them can be actualized by hardware. For example, in the case where the control unit 13 manages the receiving band by dividing it into the third frequency domain including the third frequency obtained by subtracting the intermediate frequency from the upper end frequency of the receiving band, the first frequency domain including the first frequency obtained by adding the intermediate frequency to the lower end frequency of the receiving band, and the second frequency domain in which the first frequency domain and third frequency domain overlap, and where a tuning change is made across the frequency domains, as for the data processing of switching the local oscillation frequency to the upper local oscillation frequency when the tuning frequency is higher than the third frequency by controlling the front end unit, and to the lower local oscillation frequency when the tuning frequency is lower than the first frequency by controlling the front end unit, it can be realized by one or more programs on a computer, or at least part of it can be actualized by hardware.

INDUSTRIAL APPLICABILITY

As described above, the present invention is particularly suitable for an application to an RDS radio broadcast receiver having two tuners for independently receiving different frequencies in the receiving band whose bandwidth is greater than the intermediate frequency and less than twice the intermediate frequency.

What is claimed is:

1. A radio broadcast receiver having two tuners for independently receiving different frequencies in a receiving band with a receiving bandwidth greater than an intermediate frequency and not greater than twice the intermediate frequency, the radio broadcast receiver comprising:

a front end unit for carrying out tuning by changing a local oscillation frequency; and a control unit for managing by dividing the receiving band into a third frequency domain including a third frequency obtained by subtracting the intermediate frequency from an upper end frequency of the receiving band, a first frequency domain including a first frequency obtained by adding the intermediate frequency to a lower end frequency of the receiving band, and a second frequency domain in which the first frequency domain and the third frequency domain overlap, and for switching, when a change in tuning is made across the frequency domains, a local oscillation frequency to an upper local oscillation frequency when the tuning frequency is higher than the third frequency by controlling the front end unit, and to a lower local oscillation frequency when the tuning frequency is lower than the first frequency by controlling the front end unit.

2. The radio broadcast receiver according to claim 1, wherein the control unit controls a high-frequency switch together with the switching to the upper local oscillation frequency or to the lower local oscillation frequency, the high-frequency switch having its first end connected between an antenna terminal and the front end unit of each tuner and its second end grounded.

* * * * *